(12) United States Patent
Sakai et al.

(10) Patent No.: US 9,869,824 B2
(45) Date of Patent: Jan. 16, 2018

(54) OPTICAL ADAPTER

(71) Applicant: FUJITSU LIMITED, Kawasaki-shi, Kanagawa (JP)

(72) Inventors: Yukiko Sakai, Sapporo (JP); Toshihiro Ohtani, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/384,932

(22) Filed: Dec. 20, 2016

(65) Prior Publication Data

US 2017/0212310 A1 Jul. 27, 2017

(30) Foreign Application Priority Data

Jan. 25, 2016 (JP) .................... 2016-011667

(51) Int. Cl.
*G02B 6/38* (2006.01)

(52) U.S. Cl.
CPC ......... *G02B 6/3825* (2013.01); *G02B 6/3814* (2013.01); *G02B 6/3826* (2013.01); *G02B 6/3879* (2013.01); *G02B 6/3893* (2013.01)

(58) Field of Classification Search
None
See application file for complete search history.

(56) References Cited

U.S. PATENT DOCUMENTS

| 8,348,517 B2* | 1/2013 | Mudd | G02B 6/3849 385/53 |
| 8,676,022 B2* | 3/2014 | Jones | G02B 6/3849 385/139 |
| 9,196,997 B2* | 11/2015 | Sanders | G02B 6/3849 |
| 9,310,567 B2* | 4/2016 | Tanaka | G02B 6/3849 |
| 9,494,746 B2* | 11/2016 | Sanders | G02B 6/3825 |
| 2003/0147597 A1* | 8/2003 | Duran | G02B 6/3825 385/76 |
| 2004/0052473 A1* | 3/2004 | Seo | G02B 6/3849 385/73 |
| 2006/0269206 A1 | 11/2006 | Zimmel | |
| 2007/0098330 A1* | 5/2007 | Ozawa | G02B 6/3825 385/76 |
| 2010/0054665 A1 | 3/2010 | Jones et al. | |

(Continued)

FOREIGN PATENT DOCUMENTS

| JP | 2004-94109 | 3/2004 |
| JP | 2008-542822 | 11/2008 |
| JP | 2012-501470 | 1/2012 |

*Primary Examiner* — Rhonda Peace
(74) *Attorney, Agent, or Firm* — Fujitsu Patent Center

(57) ABSTRACT

An optical adapter includes: a housing having a plurality of openings on each of opposite end surfaces thereof; a plurality of ports formed in parallel with each other inside the housing and each extending to form one of the openings on each of the opposite ends surfaces, an optical connector being inserted into each of the openings; and a shutter part installed at each of the ports such that when the optical connector is inserted into an opening of one end of the port, the shutter part leans back to a retreat position that passes light emitted from the optical connector inserted into an opening of another end of the port, when the optical connector is pulled out of the opening of the one end of the port, the shutter part is raised up from the retreat position to a blocking position that blocks the emitted light.

6 Claims, 19 Drawing Sheets

(56) References Cited

U.S. PATENT DOCUMENTS

2013/0121643 A1* 5/2013 Sanders ............ G02B 6/3849
                                                    385/56
2015/0241650 A1* 8/2015 Travis .................. G02B 6/3825
                                                    385/135

* cited by examiner

OPTICAL ADAPTER

CROSS-REFERENCE TO RELATED APPLICATION

This application is based upon and claims the benefit of priority of the prior Japanese Patent Application No. 2016-011667, filed on Jan. 25, 2016, the entire contents of which are incorporated herein by reference.

FIELD

The embodiments discussed herein are related to an optical adapter.

BACKGROUND

Conventionally, an optical adapter provided with a port having opposite ends into which optical connectors are to be inserted, respectively, has been used as an interface component for connecting the optical connectors within an optical transmission device. In the optical adapter, it is assumed that when the optical connector is pulled out of one end of the port, light emitted from an optical connector inserted into the other end of the port is leaked to the outside. The leakage of the light emitted from the optical adapter hinders the safety of a user of the optical adapter.

Thus, as a measure to avoid the leakage of the emitted light, an optical adapter provided with a shutter part which is opened/closed with the insertion/the pulling out of an optical connector, at one end or each of opposite ends of the optical adapter has been developed. In the optical adapter, when an optical connector is inserted into one end of the port, the shutter part leans back to a retreat position that does not block light emitted from an optical connector inserted into the other end of the port. Then, when the optical connector is pulled out of the one end of the port, the shutter part is raised up to a blocking position that blocks the emitted light, from the retreat position and reflects the blocked emitted light onto a predetermined surface of the housing of the optical adapter. Accordingly, the leakage of the light emitted from the optical adapter when the optical connector is pulled out is avoided.

However, in recent, a multi-port type optical adapter having a plurality of ports inside one housing has been developed with the implementation of high density within an optical transmission device. When the shutter part is applied to the multi-port type optical adapter, it is assumed that the shutter part is installed at one end or each of opposite ends of each port.

FIG. 19 is a view illustrating an exemplary configuration of a multi-port type optical adapter. The multi-port type optical adapter 100 illustrated in FIG. 19 includes a plurality of ports 120 (ports 120-1 to 120-4) provided in parallel with each other inside a housing 110. Hereinafter, the ports 120-1 to 120-4 may be collectively referred to as ports 120 when the ports 120-1 to 120-4 are not required to be discriminated from each other. Likewise, the other components such as shutter parts 130-1 to 130-4 may also be collectively referred to. The shutter parts 130 are provided at one-side ends of the ports 120, respectively. Optical connectors 140 are inserted into the other-side ends of the ports 120, respectively. In this state, when the optical connectors 140 are pulled out of the one-side ends of the ports 120, the shutter parts 130 are raised up to the blocking position that blocks the light emitted from the optical connectors 140, from the retreat position. Then, the shutter parts 130 reflect the blocked emitted light onto the common surface of the housing 110 among all the ports 120-1 to 120-4, i.e., the bottom surface 110 of the housing 110.

However, when the emitted light reflected from all the shutter parts 130 is directed toward the bottom surface 110a of the housing 110, only the bottom surface 110a is intensively heated by the irradiation of the emitted light, and hence, the optical adapter 100 itself generates heat.

As described above, in the multi-port type optical adapter, when the shutter parts entirely reflect the emitted light to the common surface of the housing among the ports, the heating value of the optical adapter increases. Recently, there has been the tendency that the number of ports in the multi-port type optical adapter gradually increases, and the heating value of the optical adapter may gradually increase with the increase of the number of ports. When the heating value of the optical adapter increases, the housing of the optical adapter may be melted.

The following is a reference document.
[Document 1] Japanese Laid-Open Patent Publication No. 2004-94109.

SUMMARY

According to an aspect of the invention, an optical adapter includes: a housing having a plurality of openings on each of opposite end surfaces thereof; a plurality of ports formed in parallel with each other inside the housing and each extending to form one of the openings on each of the opposite ends surfaces, an optical connector being inserted into each of the openings; and a shutter part installed at each of the ports such that when the optical connector is inserted into an opening of one end of the port, the shutter part leans back to a retreat position that passes light emitted from the optical connector inserted into an opening of another end of the port, when the optical connector is pulled out of the opening of the one end of the port, the shutter part is raised up from the retreat position to a blocking position that blocks the emitted light, and in the blocking position, the shutter part reflects the emitted light onto a surface of the housing which is different from that in another port.

The object and advantages of the disclosure will be realized and attained by means of the elements and combinations particularly pointed out in the claims.

It is to be understood that both the foregoing general description and the following detailed description are exemplary and explanatory and are not restrictive of the disclosure, as claimed.

DESCRIPTION OF EMBODIMENTS

Figure 1:
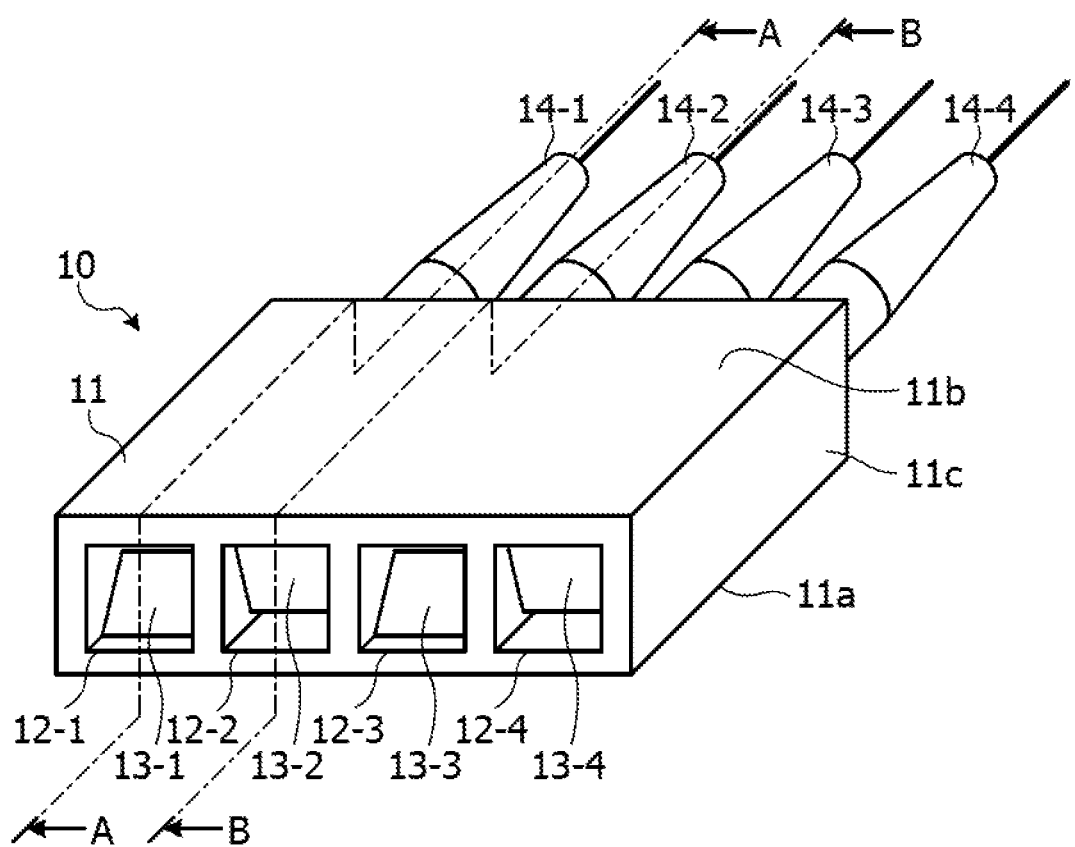
FIG. 1 is a view illustrating an exemplary configuration of an optical adapter of Embodiment 1.

Hereinafter, embodiments of the optical adapter of the present disclosure will be described in detail based on the accompanying drawings. The present disclosure is not limited to the embodiments. In the embodiments, components having the same function will be denoted by the same reference numeral, and overlapping descriptions thereof will be omitted.

Embodiment 1

FIG. 1 is a view illustrating an exemplary configuration of an optical adapter of Embodiment 1. In FIG. 1, the optical adapter 10 is a multi-port type optical adapter and includes a housing 11 and a plurality of ports 12 (ports 12-1 to 12-4). The housing 11 is made of, for example, a resin. The housing 11 has a bottom surface 11a, a top surface 11b, and two lateral surfaces 11c.

The plurality of ports 12 (ports 12-1 to 12-4) are provided in parallel with each other inside the housing 11. Here, the number of the ports 12 is four (4), but is not limited thereto. Optical connectors 14-1 to 14-4 are inserted into the opposite ends of the ports 12-1 to 12-4, respectively. The example of FIG. 1 represents a state where the optical connectors 14-1 to 14-4 are not inserted into one-side ends of the ports 12-1 to 12-4, and are inserted into the other-side ends of the ports 12-1 to 12-4, respectively. Hereinafter, the ports 12-1 to 12-4 may be collectively referred to as ports 12 when the ports 12-1 to 12-4 are not required to be discriminated from each other. The other components may also be collectively referred to.

In addition, the optical adapter 10 includes the shutter parts 13-1 to 13-4. The shutter parts 13-1 to 13-4 are provided at the one-side ends of the ports 12, respectively. Each shutter part 13 is, for example, a plate-shape member having elasticity. When the optical connectors 14 are inserted into the one-side ends of the ports 12, respectively, the shutter parts 13 lean back to a "retreat position" due to the pushing by the optical connectors 14. Here, the "retreat position" indicates a position that does not block the light (which may be referred to as "emitted light" hereinafter) emitted from the optical connectors 14 inserted into the other-side ends of the ports 12. When the shutter parts 13 lean back to the "retreat position," the optical connectors 14 inserted into the one-side ends of the ports 12 and the optical connectors 14 inserted into the other-side ends of the ports 12 are optically connected to each other. Meanwhile, when the optical connectors 14 are pulled out of the one-side ends of the ports 12, the shutter parts 13 are raised up to a "blocking position" from the "retreat position" due to the elasticity of the shutter parts 13. Here, the "blocking position" indicates a position that blocks the "emitted light."

Further, in the "blocking position," the shutter parts 13 reflect the "emitted light" onto different surfaces of the housing 11 between two adjacent ports 12. Specifically, in the "blocking position," the shutter parts 13 reflect the "emitted light" onto the bottom surface 11a or the top surface 11b of the housing 11. In other words, the shutter parts 13 are provided at the one-side ends of the ports 12 in a state where the "emitted light" reflecting surfaces of the shutter parts 13 raised up to the "blocking position" face to different surfaces of the housing 11 between two adjacent ports 12. Accordingly, since the surfaces of the housing 11 irradiated by the "emitted light" reflected from the shutter parts 13 are distributed, there is no occasion where only one surface of the housing is heated. As a result, the heat generation of the multi-port type optical adapter 10 may be suppressed.

Figure 2:
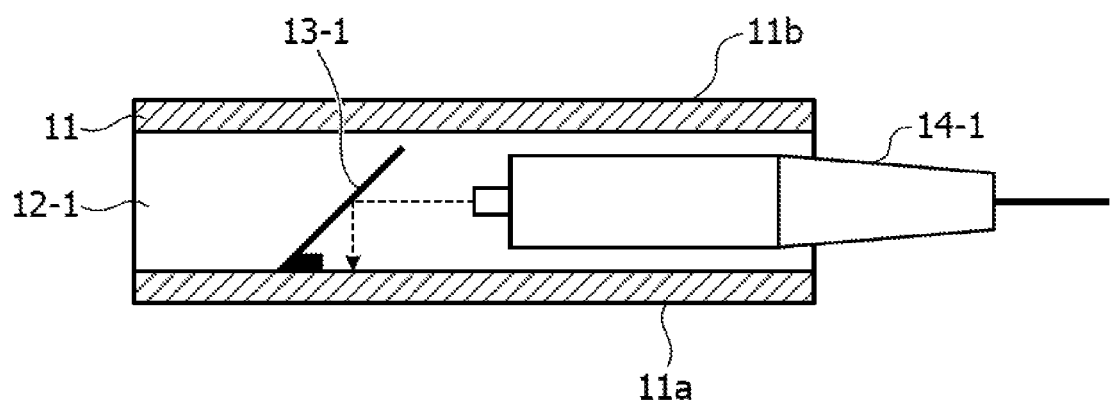
FIG. 2 is a sectional view taken along the arrow A-A of FIG. 1.
Figure 3:
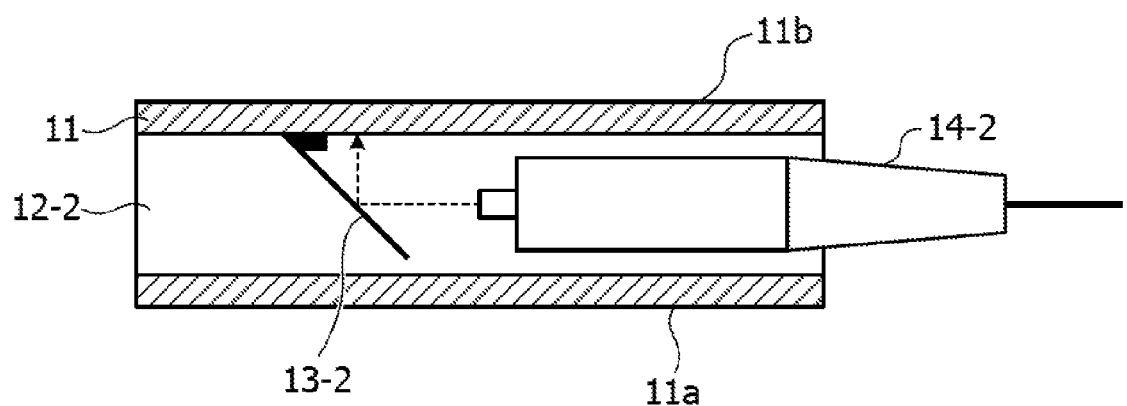
FIG. 3 is a sectional view taken along the arrow B-B of FIG. 1.

FIG. 2 is a sectional view taken along the arrow A-A of FIG. 1, and FIG. 3 is a sectional view taken along the arrow B-B of FIG. 1. FIGS. 2 and 3 represent a state where the shutter parts 13 are raised up to the "blocking position" from the "retreat position" when the optical connectors 14 are pulled out of the one-side ends of the ports 12. In FIGS. 2 and 3, the dashed line arrow represents an optical path of the "emitted light" from the optical connectors 14 inserted into the other-side ends of the ports 12.

As illustrated in FIG. 2, in the "blocking position," the shutter part 13-1 provided in the port 12-1 reflects the "emitted light" onto the bottom surface 11a of the housing 11. Meanwhile, as illustrated in FIG. 3, in the "blocking position," the shutter part 13-2 provided in the port 12-2 reflects the "emitted light" onto the top surface 11b of the housing 11.

In this way, in the "blocking position," the shutter part 13-1 and the shutter part 13-2 reflect the "emitted light" onto the different surfaces of the housing 11 between the two adjacent ports 12-1 and 12-2.

As described above, according to the present embodiment, the optical adapter 10 includes the plurality of ports 12 provided in parallel with each other inside the housing 11, and the shutter parts 13 provided at one-side ends of the ports 12, respectively. When the optical connectors 14 are pulled out of the one-side ends of the respective ports 12, in the "blocking position," the shutter parts 13 reflect the "emitted light" from the optical connectors 14 inserted into the other-side ends of the ports 12 onto the different surfaces of the housing 11 between the adjacent ports 12.

By the configuration of the optical adapter 10, since the surfaces of the housing 11 irradiated by the "emitted light" reflected from the shutter parts 13 are distributed, the housing 11 is not intensively heated at only one surface thereof. As a result, the heat generation of the multi-port type optical adapter 10 may be suppressed.

Further, in the "blocking position," the shutter parts 13 reflect the "emitted light" onto the bottom surface 11a or the top surface 11b of the housing 11.

By the configuration of the optical adapter 10, since the surfaces of the housing 11 irradiated by the "emitted light" reflected from the shutter parts 13 are distributed into the bottom surface 11a and the top surface 11b of the housing 11, the housing 11 is not intensively heated at only one surface. As a result, the heat generation of the multi-port type optical adapter 10 on the bottom surface 11a and the top surface 11b may be suppressed.

Embodiment 2

Embodiment 2 relates to a variation of the shutter parts of Embodiment 1.

Figure 4:
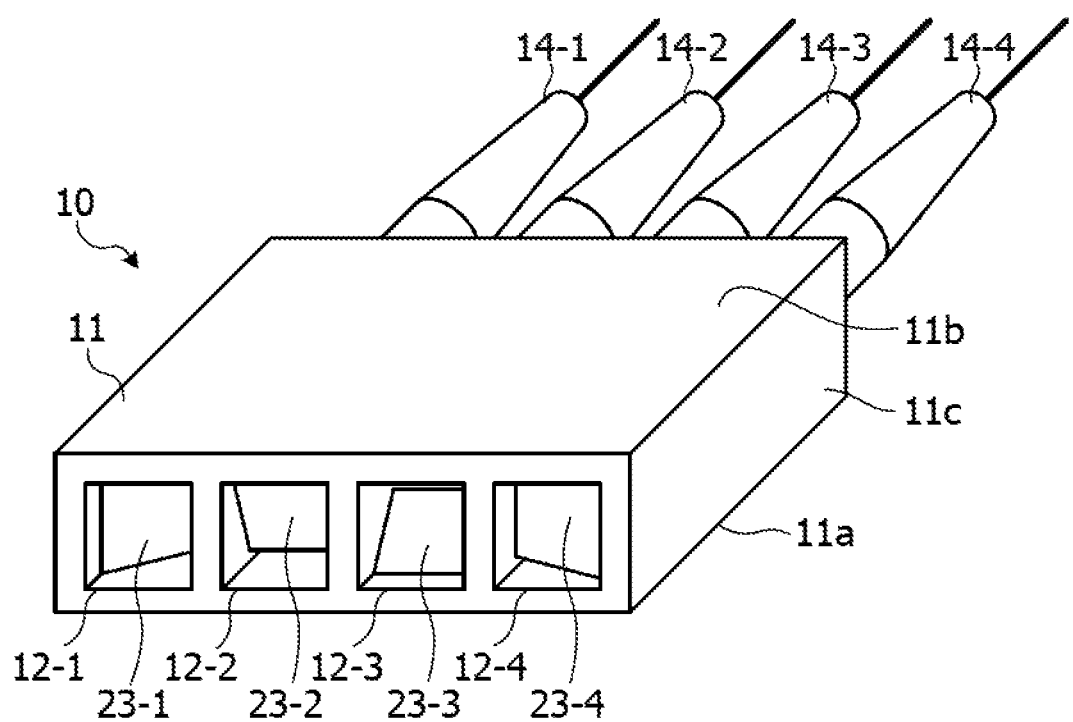
FIG. 4 is a view illustrating an exemplary configuration of an optical adapter of Embodiment 2.

FIG. 4 is a view illustrating an exemplary configuration of an optical adapter of Embodiment 2. As illustrated in FIG. 4, the optical adapter 10 of Embodiment 2 includes shutter parts 23-1 to 23-4. In the "blocking position," the shutter parts 23 reflect the "emitted light" onto different surfaces of the housing 11 between two adjacent ports 12. Specifically, in the "blocking position," the shutter parts 23-1 and 23-4 provided at one-side ends of the outermost ports 12 among the plurality of ports 12 reflect the "emitted light" onto the lateral surfaces 11c of the housing 11. In addition, in the "blocking position," the shutter parts 23-2 and 23-3 disposed between the shutter parts 23-1 and 23-4 reflect the "emitted light" onto the bottom surface 11a or the top surface 11b of the housing 11.

As described above, according to the present embodiment, in the "blocking position," the shutter parts 23-1 and 23-4 provided at the one-side ends of the outermost ports 12 among the plurality of ports 12 reflect the "emitted light" onto the lateral surfaces 11c of the housing 11.

By the configuration of the optical adapter 10, since the surfaces of the housing 11 irradiated by the "emitted light" reflected from the shutter parts 23 are distributed into the bottom surface 11a, the top surface 11b, and the lateral surfaces 11c, the housing 11 is not intensively heated at only one surface. As a result, the heat generation of the multi-port type optical adapter 10 on the bottom surface 11a and the top surface 11b may be further suppressed.

Embodiment 3

Embodiment 3 relates to a variation of the shutter parts of Embodiment 1.

Figure 5:
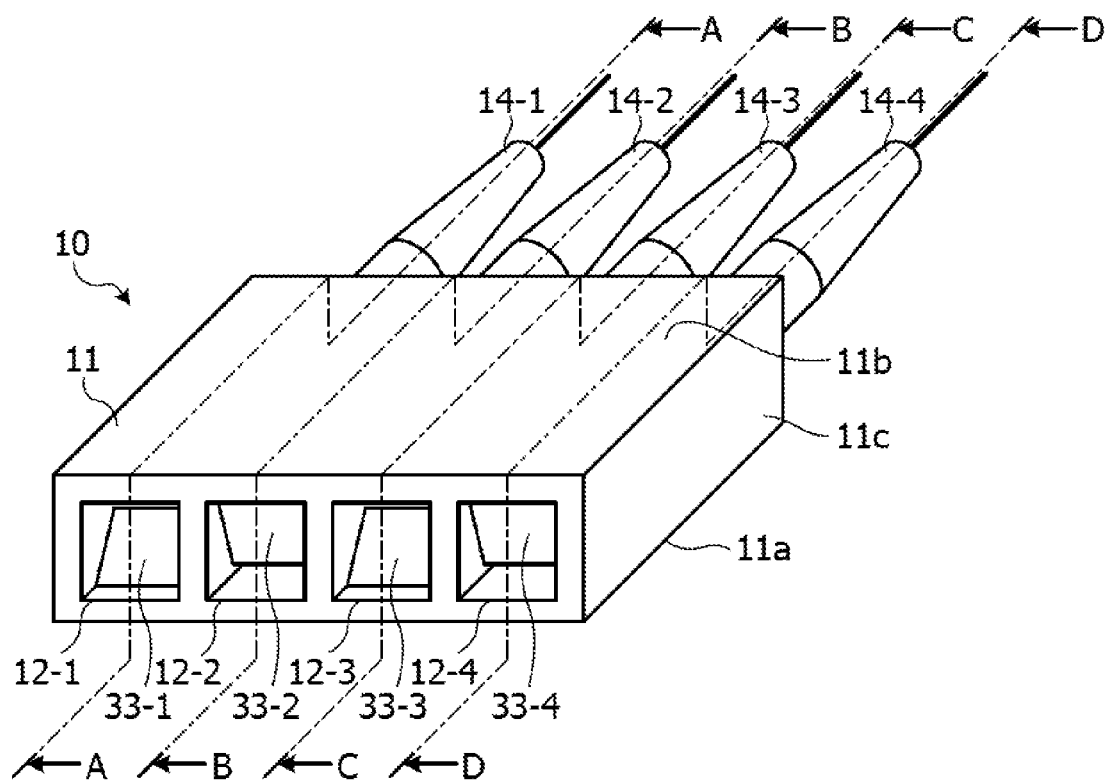
FIG. 5 is a view illustrating an exemplary configuration of an optical adapter of Embodiment 3.

FIG. 5 is a view illustrating an exemplary configuration of an optical adapter of Embodiment 3. As illustrated in FIG. 5, the optical adapter 10 of Embodiment 3 includes the shutter parts 33-1 to 33-4. In the present embodiment, the inclination angles of the shutter parts 33 raised up to the "blocking position" are different from each other between adjacent ports 12. In this state, in the "blocking position," the shutter parts 33 reflect the "emitted light" onto different surfaces of the housing 11 between two adjacent ports 12. Accordingly, since the surfaces of the housing 11 irradiated by the "emitted light" reflected from the shutter parts 33 are distributed, and the irradiated positions on the respective surfaces are deviated from each other along the longitudinal direction of the housing 11, the housing 11 is not intensively heated at only one surface. As a result, the heat generation of the multi-port type optical adapter 10 may be further suppressed.

Figure 6:
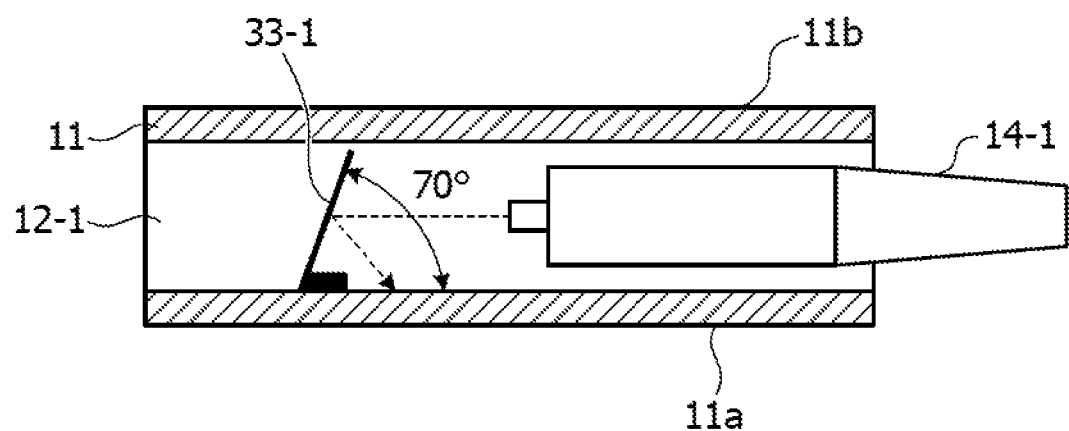
FIG. 6 is a sectional view taken along the arrow A-A of FIG. 5.
Figure 7:
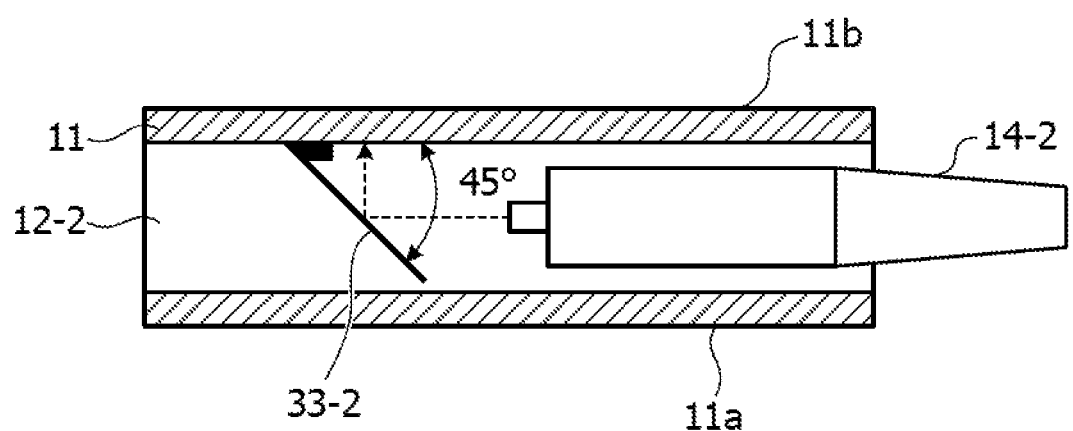
FIG. 7 is a sectional view taken along the arrow B-B of FIG. 5.
Figure 8:
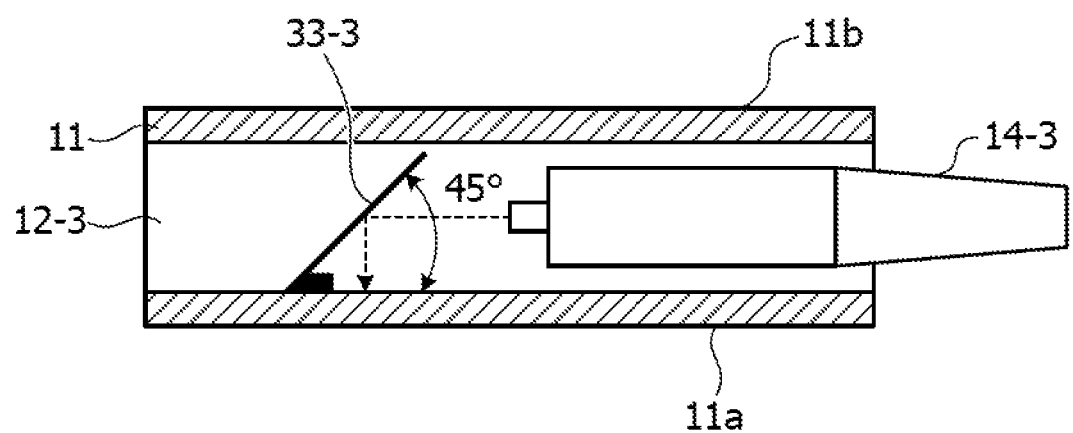
FIG. 8 is a sectional view taken along the arrow C-C of FIG. 5.
Figure 9:
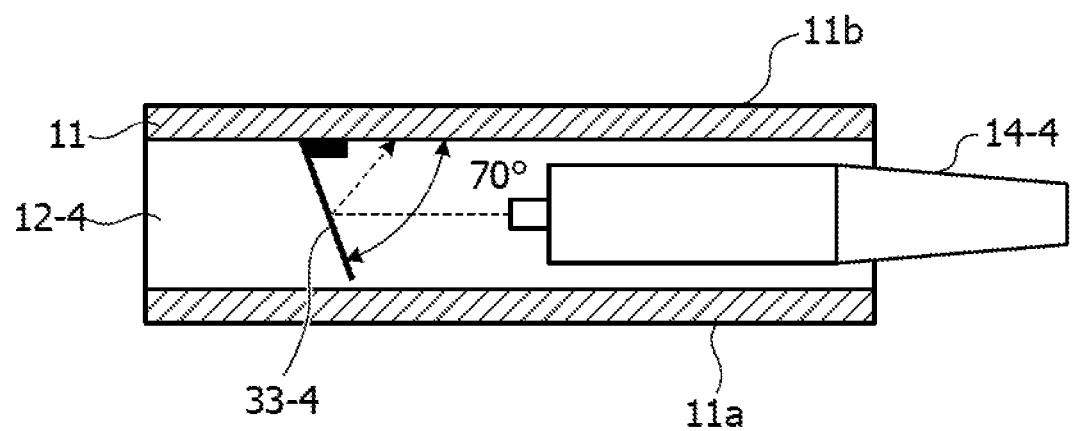
FIG. 9 is a sectional view taken along the arrow D-D of FIG. 5.

FIG. 6 is a sectional view taken along the arrow A-A of FIG. 5. FIG. 7 is a sectional view taken along the arrow B-B of FIG. 5. FIG. 8 is a sectional view taken along the arrow C-C of FIG. 5. FIG. 9 is a sectional view taken along the arrow D-D of FIG. 5. FIGS. 6 to 9 represent a state where the shutter parts 33 are raised up to the "blocking position" from the "retreat position" when the optical connectors 14 are pulled out of the one-side ends of the ports 12. In FIGS. 6 to 9, the dashed line arrow represents an optical path of the "emitted light" from the optical connectors 14 inserted into the other-side ends of the ports 12.

As illustrated in FIG. 6, the inclination angle of the shutter part 33-1 provided in the port 12-1 to the bottom surface 11a of the housing 11 is 70°, and the shutter part 33-1 reflects the "emitted light" onto the bottom surface 11a of the housing 11. Meanwhile, as illustrated in FIG. 7, the inclination angle of the shutter part 33-2 provided in the port 12-2 to the top surface 11b of the housing 11 is 45°, and the shutter part 33-2 reflects the "emitted light" onto the top surface 11b of the housing 11. Accordingly, the surfaces of the housing 11 irradiated by the "emitted light" reflected from the shutter parts 33 are distributed into the bottom surface 11a and the top surface 11b, and the irradiated positions on the respective surfaces are deviated from each other along the longitudinal direction of the housing 11.

As illustrated in FIG. 8, the inclination angle of the shutter part 33-3 provided in the port 12-3 to the bottom surface 11a of the housing 11 is 45°, and the shutter part 33-3 reflects the "emitted light" onto the bottom surface 11a of the housing 11. Meanwhile, as illustrated in FIG. 9, the inclination angle of the shutter part 33-4 provided in the port 12-4 to the top surface 11b of the housing 11 is 70°, and the shutter part 33-4 reflects the "emitted light" onto the top surface 11b of the housing 11. Accordingly, the surfaces of the housing 11 irradiated by the "emitted light" reflected from the shutter parts 33 are distributed into the bottom surface 11a and the top surface 11b, and the irradiated positions on the respective surfaces are deviated from each other along the longitudinal direction of the housing 11.

As described above, according to the present embodiment, the inclination angles of the shutter parts 33 raised up to the "blocking position" are different from each other between the adjacent ports 12.

By the configuration of the optical adapter 10, since the surfaces of the housing 11 irradiated by the "emitted light" reflected from the shutter parts 33 are distributed, and the irradiated positions on the respective surfaces are deviated from each other along the longitudinal direction of the housing 11, the housing 11 is intensively heated at only one case. As a result, the heat generation of the multi-port type optical adapter 10 may be further suppressed.

Embodiment 4

Embodiment 4 relates to a variation of the shutter parts of Embodiment 1.

Figure 10:
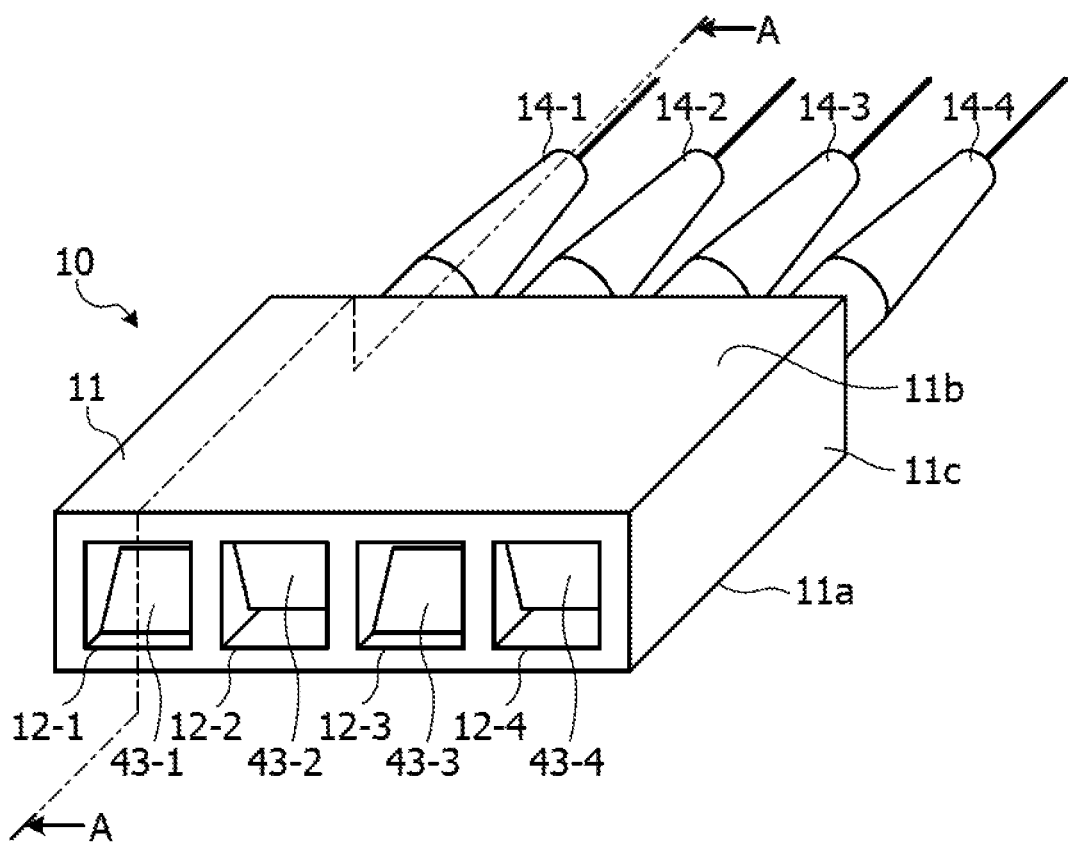
FIG. 10 is a view illustrating an exemplary configuration of an optical adapter of Embodiment 4.

FIG. 10 is a view illustrating an exemplary configuration of an optical adapter of Embodiment 4. As illustrated in FIG. 10, the optical adapter 10 of Embodiment 4 includes shutter parts 43-1 to 43-4. Each shutter part 43 includes a "light diffusion surface." At the "blocking position," the shutter parts 43 diffuse the "emitted light" by the "light diffusion surfaces" and reflect the diffused "emitted light" onto different surfaces of the housing 11 between adjacent ports 12. Here, the "light diffusion surface" is a surface that diffuses input light and includes, for example, irregularities. The "light diffusion surface" is formed by, for example, embossing the surface of each shutter part 43 that reflects the "emitted light." In addition, the "light diffusion surface" may be formed by bending each shutter part 43.

Figure 11:
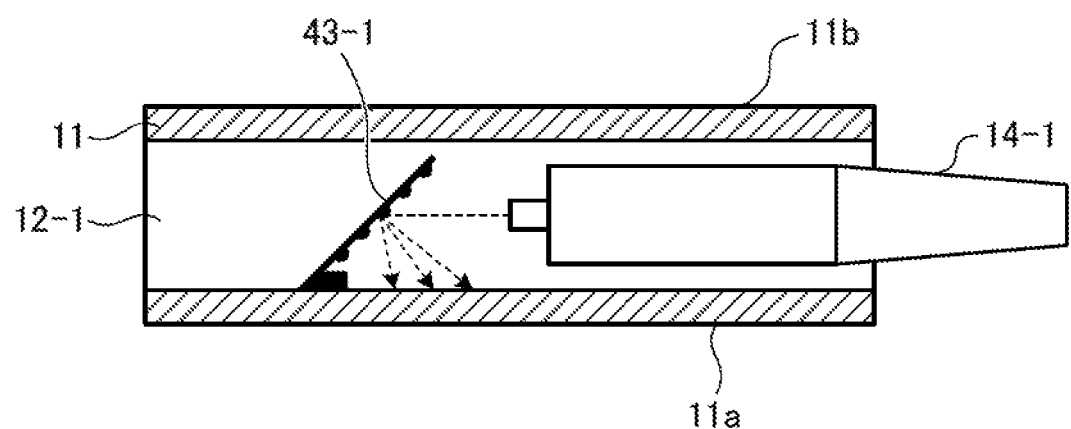
FIG. 11 is a sectional view (part 1) taken along the arrow A-A of FIG. 10.

FIG. 11 is a sectional view (part 1) taken along the arrow A-A of FIG. 10. FIG. 11 represents a state where the shutter part 43-1 is raised up to the "blocking position" from the "retreat position" when the optical connector 14-1 is pulled out of one end of the port 12-1. In FIG. 11, the dashed line arrow represents an optical path of the "emitted light" from the optical connector 14-1 inserted into the other end of the port 12-1.

As illustrated in FIG. 11, the shutter part 43-1 provided in the port 12-1 includes the "light diffusion surface" formed by the embossing. At the "blocking position," the shutter part 43-1 diffuses the "emitted light" by the "light diffusion surface" and reflects the "emitted light" onto the bottom surface 11a of the housing 11.

Figure 12:
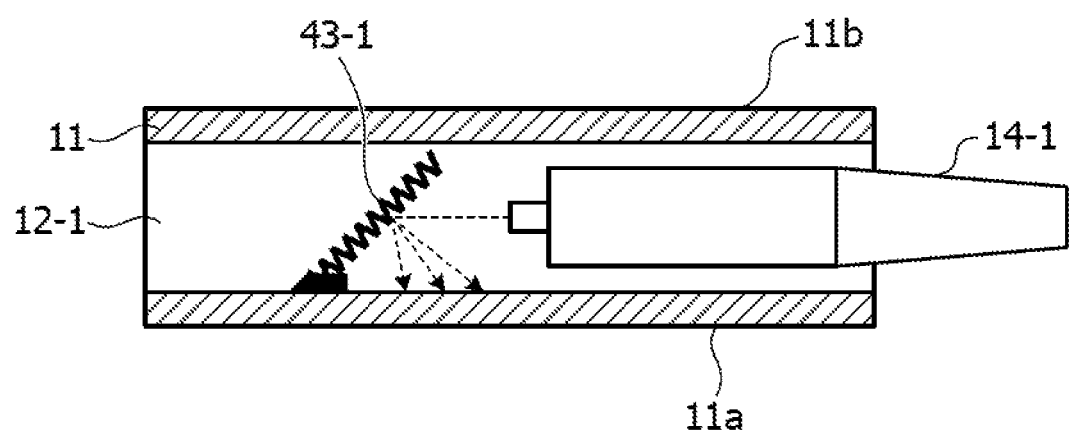
FIG. 12 is a sectional view (part 2) taken along the arrow A-A of FIG. 10.

FIG. 12 is a sectional view (part 2) taken along the arrow A-A of FIG. 10. FIG. 12 represents a state where the shutter part 43-1 is raised up to the "blocking position" from the "retreat position" when the optical connector 14-1 is pulled out of the one end of the port 12-1. In FIG. 12, the dashed line arrow represents an optical path of the "emitted light" from the optical connector 14-1 inserted into the other end of the port 12-1.

As illustrated in FIG. 12, the shutter part 43-1 provided in the port 12-1 includes the "light diffusion surface" formed by the bending. At the "blocking position," the shutter part 43-1 diffuses the "emitted light" by the "light diffusion surface" and reflects the diffused "emitted light" onto the bottom surface 11a of the housing 11.

As described above, according to the present embodiment, each shutter part 43 includes the "light diffusion surface." In the "blocking position," the shutter parts 43 diffuse the "emitted light" by the "light diffusion surfaces" and reflect the diffused "emitted light" onto the different surfaces of the housing 11 between the adjacent ports 12.

By the configuration of the optical adapter 10, since the surfaces of the housing 11 irradiated by the "emitted light" reflected from the shutter parts 43 are distributed, and the irradiated portions on the respective surfaces become wide, the local heating is suppressed. As a result, the heat generation of the multi-port type optical adapter 10 may be further suppressed.

Embodiment 5

The optical adapter 10 of Embodiment 5 is different from the optical adapter 10 of Embodiment 1 in that the surroundings of the housing 11 in Embodiment 5 are covered with a cover member.

Figure 13:
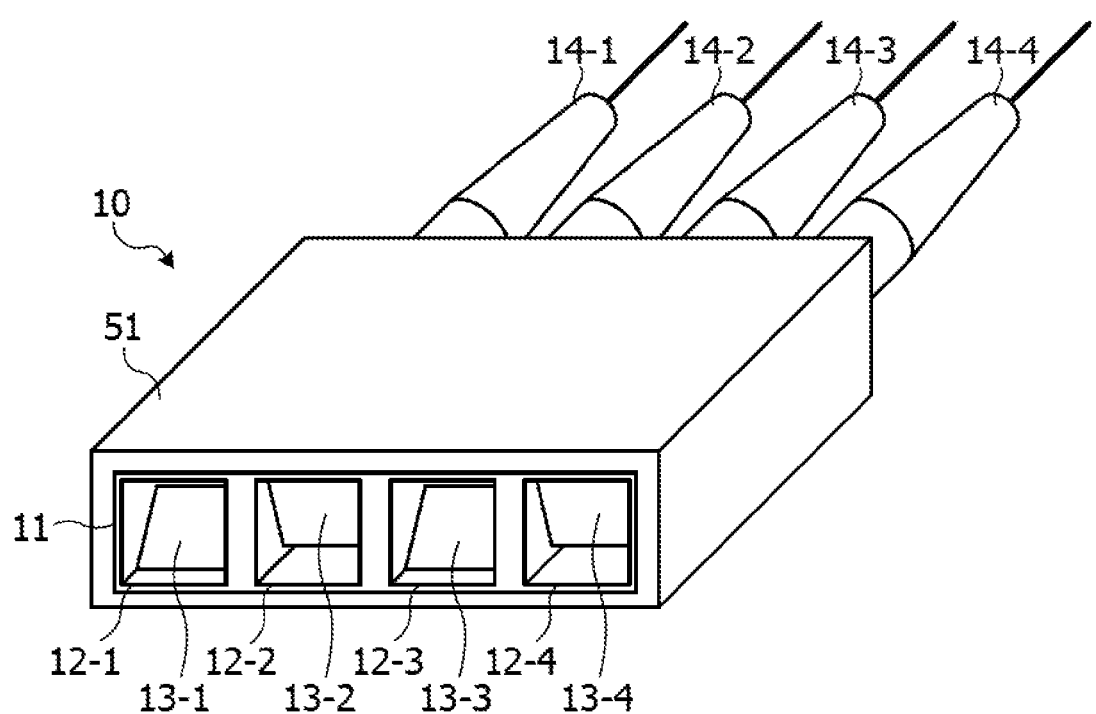
FIG. 13 is a view illustrating an exemplary configuration of an optical adapter of Embodiment 5.

FIG. 13 is a view illustrating an exemplary configuration of the optical adapter of Embodiment 5. As illustrated in FIG. 13, the optical adapter 10 of Embodiment 5 includes a cover member 51. The cover member 51 covers the surroundings of the housing 11 and has a higher conductivity than the housing 11. The cover member 51 is made of a metal such as aluminum.

As described above, according to the present embodiment, the optical adapter 10 includes the cover member 51 that covers the surroundings of the housing 11 and has the higher thermal conductivity than the housing 11.

By the configuration of the optical adapter 10, since the surroundings of the housing 11 are covered by the cover member 51, the heat generated in the housing 11 may be dissipated to the outside through the cover member 51. As a result, the heat generation of the multi-port type optical adapter 10 may be further suppressed.

Embodiment 6

The optical adapter 10 of Embodiment 6 is different from the optical adapter 10 of Embodiment 5 in that the shutter parts 13 raised up to the "blocking position" are in contact with the cover member 51.

Since the configuration of the optical adapter 10 of Embodiment 6 is the same as that of Embodiment 5, descriptions thereof will be omitted.

Figure 14:
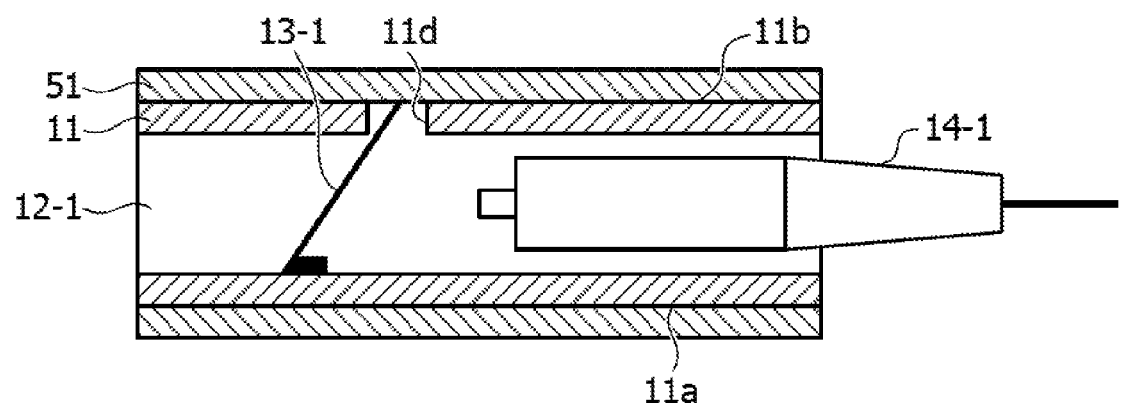
FIG. 14 is a side sectional view illustrating an exemplary configuration of a cover member of Embodiment 6.

FIG. 14 is a side sectional view illustrating an exemplary configuration of the cover member of Embodiment 6. In FIG. 14, the same portions as those in FIG. 13 will be denoted by the same reference numerals as used in FIG. 13.

As illustrated in FIG. 14, in the optical adapter 10 of Embodiment 6, the housing 11 includes an opening 11d. The shutter part 13-1 raised up to the "blocking position" is in contact with the cover member 51 through the opening 11d of the housing 11. In addition, although not illustrated, the housing 11 includes other openings, and the other shutter parts 13 (the shutter parts 13-2 to 13-4) are in contact with the cover member 51 through the other openings of the housing 11.

As described above, according to the present embodiment, the shutter parts 13 raised up to the "blocking position" are in contact with the cover member 51 through the opening of the housing 11.

By the configuration of the optical adapter 10, the heat generated in the shutter parts 13 may be dissipated to the outside through the cover member 51. As a result, the heat generation of the multi-port type optical adapter 10 may be further suppressed.

Embodiment 7

In the optical adapter 10 of Embodiment 1, the shutter parts 13 are provided at the one-side ends of the ports 12, respectively. Meanwhile, in the optical adapter 10 of Embodiment 7, the shutter parts 13 are provided at the opposite ends of the ports 12, respectively.

Figure 15:
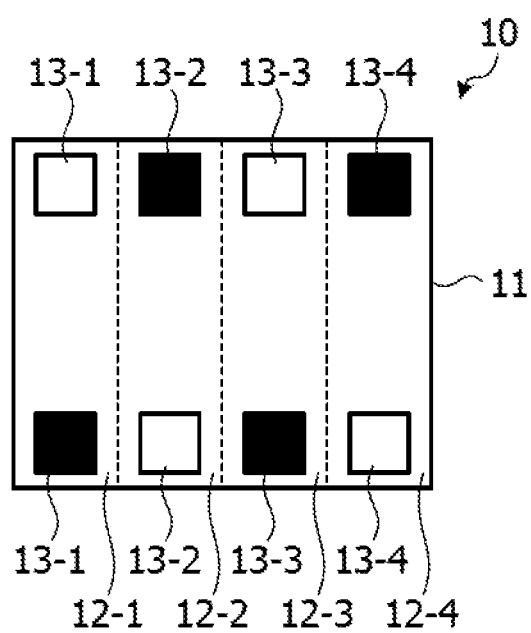
FIG. 15 is a view illustrating an exemplary configuration of an optical adapter of Embodiment 7.

FIG. 15 is a view illustrating an exemplary configuration of the optical adapter of Embodiment 7. As illustrated in FIG. 15, in the optical adapter 10, the shutter parts 13-1 to 13-4 are provided at the opposite ends of the ports 12, respectively. In the "blocking position," the shutter parts 13 reflect the "emitted light" onto different surfaces of the housing 11 between adjacent ports 12 and between the opposite ends of each port 12. Hereinafter, it is assumed that the shutter parts 13 are represented in black when the shutter parts 13 reflect the "emitted light" onto the bottom surface 11a of the housing 11. Further, it is assumed that the shutter parts 13 are represented in white when the shutter parts 13 reflect the "emitted light" onto the top surface 11b of the housing 11.

Figure 16:
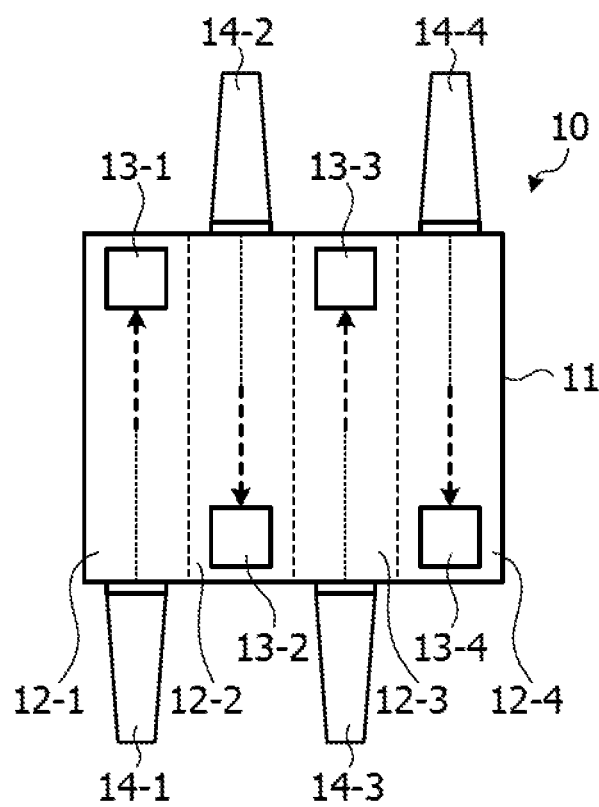
FIG. 16 is a view for explaining a use state of the optical adapter of Embodiment 7.
Figure 17:
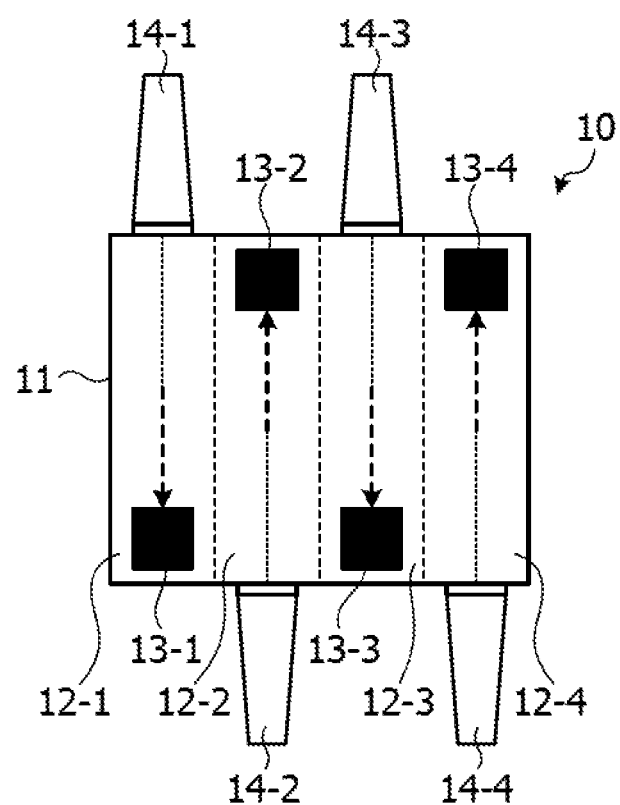
FIG. 17 is a view for explaining a use state of the optical adapter of Embodiment 7.
Figure 18:
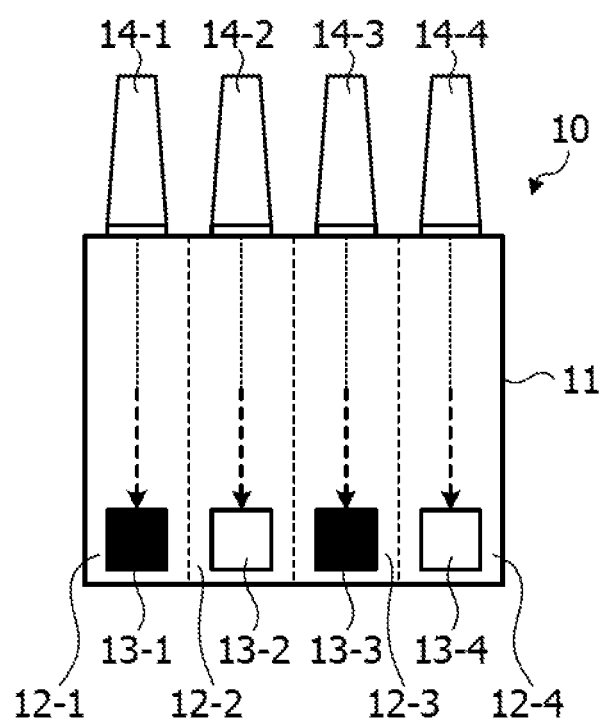
FIG. 18 is a view for explaining a use state of the optical adapter of Embodiment 7.
Figure 19:
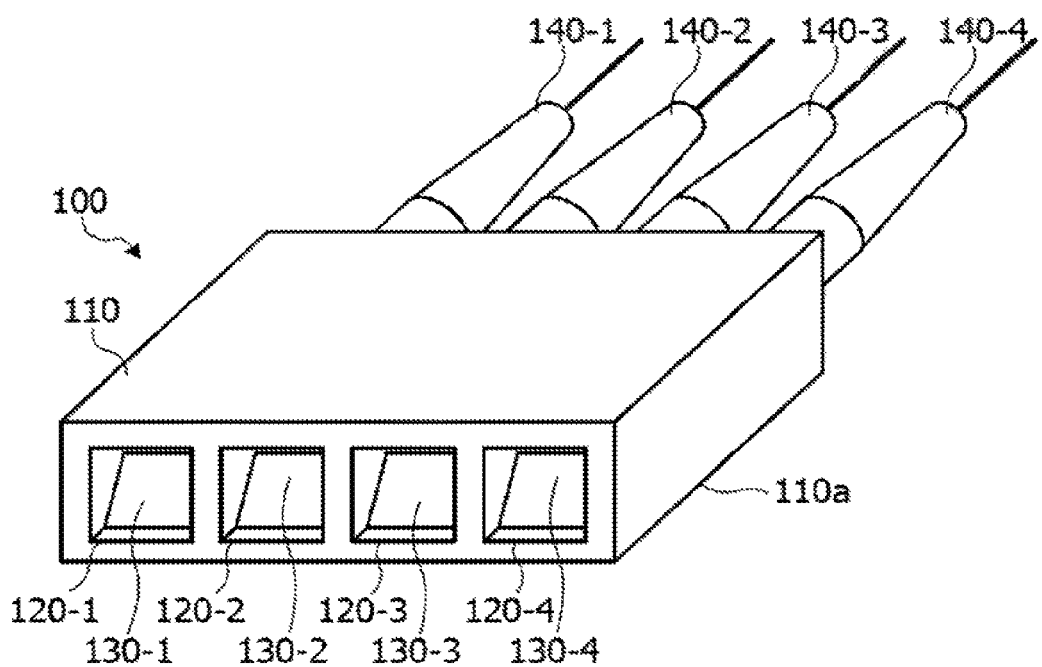
FIG. 19 is a view illustrating an exemplary configuration of a multi-port type optical adapter.

FIGS. 16 to 18 are views for explaining a state of using the optical adapter of Embodiment 7. In FIGS. 16 to 18, for the convenience of descriptions, of the opposite ends of each port 12, the end positioned at the lower side of each drawing will be regarded as "one end," and the end positioned at the upper side in each drawings will be regarded as "the other end."

The example of FIG. 16 represents a case (hereinafter, referred to as a "case C1") in which the optical connectors 14-1 and 14-3 are inserted into one-side ends of the ports 12-1 and 12-3, respectively, and the optical connectors 14-2 to 14-4 are inserted into the other-side ends of the ports 12-2 to 12-4, respectively. In the case C1, the shutter part 13-1 provided at the other end of the port 12-1 reflects the "emitted light" from the optical connector 14-1 onto the top surface 11b of the housing 11. The shutter part 13-2 provided at the one end of the port 12-2 reflects the "emitted light" from the optical connector 14-2 onto the top surface 11b of the housing 11. The shutter part 13-3 provided at the other end of the port 12-3 reflects the "emitted light" from the optical connector 14-3 onto the top surface 11b of the housing 11. The shutter part 13-4 provided at the one end of the port 12-4 reflects the "emitted light" from the optical connector 14-4 onto the top surface 11b of the housing 11. In the case C1, the surfaces of the housing 11 irradiated by the "emitted light" reflected from the shutter parts 13 are the same (that is, the top surface 11b). However, since the irradiated positions are physically spaced apart from each other, the housing 11 is not excessively heated at only one surface.

The example of FIG. 17 represents a case (hereinafter, referred to as a "case C2") in which the optical connectors 14-1 and 14-3 are inserted into the one-side ends of the ports 12-1 and 12-3, respectively, and the optical connectors 14-2 and 14-4 are inserted into the other-side ends of the ports 12-2 and 12-4, respectively. In the case C2, the shutter part 13-1 provided at the one end of the port 12-1 reflects the "emitted light" from the optical connector 14-1 onto the bottom surface 11a of the housing 11. The shutter part 13-2 provided at the other end of the port 12-2 reflects the "emitted light" from the optical connector 14-2 onto the bottom surface 11a of the housing 11. The shutter part 13-3 provided at the one end of the port 12-3 reflects the "emitted light" from the optical connector 14-3 onto the bottom surface 11a of the housing 11. The shutter part 13-4 provided at the other end of the port 12-4 reflects the "emitted light" from the optical connector 14-4 onto the bottom surface 11a of the housing 11. In the case C2, the surfaces of the housing 11 irradiated by the "emitted light" reflected from the shutter parts 13 are the same (that is, the bottom surface 11a). However, since the irradiated positions are physically spaced apart from each other, the housing 11 is not excessively heated at only one surface.

The example of FIG. 18 represents a case (hereinafter, referred to as a "case C3") in which the optical connectors 14-1 to 14-4 are inserted into the other-side ends of the ports 12-1 to 12-4, respectively. In the case C3, the shutter part 13-1 provided at one end of the port 12-1 reflects the "emitted light" from the optical connector 14-1 onto the bottom surface 11a of the housing 11. The shutter part 13-2 provided at the other end of the port 12-2 reflects the "emitted light" from the optical connector 14-2 onto the top surface 11b of the housing 11. The shutter part 13-3 provided at one end of the port 12-3 reflects the "emitted light" from the optical connector 14-3 onto the bottom surface 11a of the housing 11. The shutter part 13-4 provided at one end of the port 12-4 reflects the "emitted light" from the optical connector 14-4 onto the top surface 11b of the housing 11. In the case C3, since the surfaces of the housing 11 irradiated by the "emitted light" reflected from the shutter parts 13 are distributed, the housing 11 is not intensively heated at only one surface.

As described above, according to the present embodiment, the shutter parts 13 are provided at the opposite ends of the ports 12, respectively. In the "blocking position," the shutter parts 13 reflect the "emitted light" onto different surfaces of the housing 11 between adjacent two ports 12 and between the opposite ends of each port 12.

By the configuration of the optical adapter 10, even when one of the opposite ends of each port 12 is allocated to an input our output terminal, the housing 11 is not intensively heated at only one surface. As a result, the heat generation of the multi-port type optical adapter 10 may be suppressed while ensuring a degree of freedom in design.

In the descriptions above, an individual configuration and operation are described for each embodiment. However, the optical adapter 10 according to each of the foregoing embodiments may have the unique components of the other embodiments. Further, the number of the embodiments to be combined is not limited to 2, and an arbitrary combination such as a combination of three or more embodiments may be adopted. For example, the optical adapter 10 according to Embodiment 2 may have the cover member 51 according to Embodiment 5. In addition, one optical adapter 10 may have all the foregoing components of Embodiments 1 to 7 within a compatible range.

All examples and conditional language recited herein are intended for pedagogical purposes to aid the reader in understanding the disclosure and the concepts contributed by the inventor to furthering the art, and are to be construed as being without limitation to such specifically recited examples and conditions, nor does the organization of such examples in the specification relate to a showing of the superiority and inferiority of the disclosure. Although the embodiments of the present disclosure have been described in detail, it should be understood that the various changes, substitutions, and alterations could be made hereto without departing from the spirit and scope of the disclosure.

What is claimed is:

1. An optical adapter comprising:
    a housing having a plurality of openings on each of opposite end surfaces thereof;
    a plurality of ports formed in parallel with each other inside the housing and each extending to form one of the openings on each of the opposite ends surfaces, an optical connector is capable of being inserted into each of the openings;
    a shutter installed at each of the ports such that when the optical connector is inserted into an opening of one end of the port, the shutter leans back to a retreat position that passes light emitted from the optical connector inserted into an opening of another end of the port, and when the optical connector is pulled out of the opening of the one end of the port, the shutter is raised up from the retreat position to a blocking position that blocks the emitted light; and
    a cover that covers surroundings of the housing and having a higher thermal conductivity than the housing,
    wherein the housing includes another opening which is different from the openings, and the shutter raised up to the blocking position is in contact with the cover through the another opening, and
    in the blocking position, the shutter reflects the emitted light onto a surface of the housing which is different from that in an adjacent port.

2. The optical adapter according to claim 1, wherein, in the blocking position, the shutter reflects the emitted light onto a bottom surface or a top surface of the housing.

3. The optical adapter according to claim 1, wherein, in the blocking position, the shutter installed at one end of an outermost port among the plurality of ports reflects the emitted light onto a lateral surface of the housing.

4. The optical adapter according to claim 1, wherein an inclination angle of the shutter raised up to the blocking position is different from that in an adjacent port.

5. The optical adapter according to claim 1, wherein the shutter includes a light diffusion surface, and, in the blocking position, diffuses the emitted light by the light diffusion surface to reflect the diffused emitted light onto a surface of the housing which is different from that in an adjacent port.

6. The optical adapter according to claim 1, wherein the shutter is installed at each of opposite ends of the ports, and reflects the emitted light from either of the opposite ends of each of the ports.

* * * * *